my hydroxy cobalt salt of 23% metal content. The chemical reaction proceeded very speedily and with very little foaming. The entire process was carried out in less than one hour. The resultant product showed a metal content of approximately 2%. It readily dissolved in oxidizable varnishes and oils to which it was added. Furthermore this soluble cobalt drier possessed excellent color and performed its drying function in the final coating composition with high efficiency.

EXAMPLE 2

674 lbs. of oleic acid were brought to a temperature of approximately 370° F. There was then introduced, under constant agitation, 326 lbs. of my hydroxy cobalt salt of 23% metal content. The reaction rapidly proceeded with the giving off of water formed by the reaction and was completed in approximately ¾ hrs. The yield obtained was 1000 lbs. of a cobalt drier of 7½% metal content. This cobalt drier dissolved readily in an oleoresinous oxidizable vehicle to which it was added and it showed good drying performance.

EXAMPLE 3

100 lbs. of composition of the cobalt drier of the previous example was warmed up to about 200° F. and to it was then added 87½ lbs. of mineral spirits. Upon the application of some stirring a complete solution, without reaction, of the cobalt drier in the solvent was formed. This solution which carried 4% metal content was a clear mobile liquid. It dissolved in the cold by simply mixing in oxidizable film-forming materials, such as oils and varnishes and gave good drying performance.

EXAMPLE 4

600 lbs. of linseed oil fatty acids were brought to a temperature of approximately 300° F. There was then added thereto, under agitation, 450 lbs. of hydroxy cobalt salt carrying 20% metal. Within 1½ hrs. the entire quantity of the cobalt hydroxy salt had reacted with the acid and became soluble therein. The end product produced was 1,000 lbs. and contained 9% metal content. It was readily soluble in various oxidizable film-forming vehicles in which it was introduced. Its drying performance was entirely satisfactory.

EXAMPLE 5

730 lbs. of a commercial grade of tall oil sold under the trade name of "Liqro" was mixed with 270 pounds of hydroxy cobalt salt containing 23% metal. The suspension of the hydroxy metal salt in the tall oil acids was then raised to a temperature in excess of 212° F. The reaction proceeded very rapidly then with the liberation of water formed by the reaction. After reacting for approximately 1½ hrs. an end product was obtained which contained 6.2% metal and was completely soluble in various oxidizable film-forming materials, including an alkyd resin and in an ester gum varnish. Its drying performance in these vehicles was entirely satisfactory.

EXAMPLE 6

295 lbs. of 2-ethyl hexoic acid was heated to a temperature between 212° F. and its boiling point. There was then added thereto, under agitation, 705 lbs. of hydroxy cobalt compounds of 23% metal content. The reaction set in which progressed very rapidly with the liberation of water. At the end of one hour an end product resulted containing 16% cobalt metal. It was readily soluble in oxidizable type film-forming materials and gave good drying performance.

EXAMPLE 7

100 lbs. of the cobalt drier produced by the preceding example was dissolved in 166 lbs. of mineral spirits with some heat to expedite the solution. A mobile clear stable liquid resulted carrying 6% cobalt metal. This liquid was added in the cold to various drying oils including linseed oil and soya bean oil and it was found that it immediately formed a solution therewith. When drying tests were run, it was found that the drying efficiency of the resulting liquid was fully satisfactory.

EXAMPLE 8

300 lbs. of naphthenic acid of approximately 270 acid number were heated to 250° F. There was then introduced, under agitation, 200 lbs. of hydroxy cobalt salt of 23% metal content. The temperature was then raised to 300° F. and maintained at that temperature for ½ hr. The reaction ceased at the end of that period and the end product was a soluble cobalt drier of approximately 10% metal content. It was found that this drier possessed excellent solubility in various coating vehicles of the oxidizing type. Its drying performance was fully satisfactory.

The foregoing examples set forth the use of various acids in the making of soluble cobalt driers. I wish it understood, however, that the procedure specified is not limited to the use of cobalt as other drying metals may be similarly reacted to produce soluble driers, using of course appropriate quantities of the metal and the acid to bring about the desired reaction. For these reasons it is not desired to restrict the drier metal therein to cobalt merely but any suitable drying metals may be employed.

EXAMPLE 9

270 lbs. of naphthenic acid of approximately 240 acid number were mixed at room temperature with 200 lbs. of a hydroxy manganese salt of 24% metal content. The suspension of the hydroxy salt and the acid was then brought to a temperature of 300° F. The reaction proceeded quite rapidly with the evolution of water. After a period of about 2 hrs. the reaction was completed and a soluble manganese drier resulted. The metal content of this drier, which is a plastic mass, was about 10.5%. When this compound was incorporated in various oxidizable types of coating material vehicles, the drier dissolved in such vehicles and carried out its drying function to full satisfaction.

100 lbs. of the drier of this example was diluted with 75 lbs. of a petroleum thinner. Solution was very rapid and complete and the end product formed was a mobile and clear liquid containing 6% metal. This solution dissolved very rapidly in various oxidizable types of coating material vehicles to which it was added. It carried out its drying performance very satisfactory.

EXAMPLE 10

192 lbs. of a naphthenic acid of approximately 245 acid number were heated to a temperature of 230° F. There was then introduced 200 lbs. of hydroxy lead salt of 64% metal content. Agitation and heating were continued for the period of about 1 hr. At the end of that time the reaction had ceased and the end product formed was a plastic mass of a soluble lead drier. Its metal content was 34%. It was added to various varnishes and oils, and it dissolved in these vehicles very easily and provided satisfactory drying. It also dissolved very readily in various solvents, including mineral spirits and xylol, and the solutions obtained by the use of these solvents were also very effective when added to varnishes and other oxidizable type vehicles.

Example 11

604 lbs. of oleic acid and 396 lbs. of hydroxy lead salt, carrying 64% lead, were reacted at a temperature of 320° F. The end product was a plastic material carrying 25% metal. This end product was soluble in oxidizable film-forming materials and had good drying power.

Example 12

100 lbs. of the end product of the preceding example were dissolved, without reaction, in 56 lbs. of xylol. A clear solution was obtained which carried 16% lead content. This liquid was then added to various varnishes, including a phenolic varnish, and complete solution was obtained. The drying performance was equal to if not better than the standard.

Example 13

661 lbs. of linseed oil fatty acids were reacted, at a temperature above 212° F., with 354 lbs. of a hydroxy lead salt of 62% metal content. The reaction took place very rapidly with accompanying evolution of water. After approximately ¾ hr. duration, the reaction seemed to be terminated and an end product resulted in the form of a plastic mass carrying 22% lead. This lead drier was soluble in oxidizable film-forming materials and possessed good drying power. It was also soluble in various solvents including turpentine and high flash naphtha and solutions thus prepared readily dissolved in oxidizable film-forming vehicles.

Example 14

714 lbs. of a commercial grade of tall oil (sold under the name of "Liqro") was brought to a temperature of approximately 300° F. There was then stirred into it 286 lbs. of hydroxy lead of 64% metal content. The reaction proceeded very smoothly and at the end of 1¼ hrs. produced, as an end product, a soluble lead drier of approximately 18% metal content. This drier dissolved readily in various oxidizable film-forming vehicles, including a linseed oil-limed rosin varnish and bodied linseed oil.

Example 15

375 lbs. of 2-ethyl hexoic acid were reacted, at a temperature above 212, F. but below its boiling point, with 625 lbs. of a hydroxy salt of lead of 64% metal content. Heating with agitation were carried on for approximately one hour, at the end of which a soluble lead drier possessing a metal content of approximately 40% was obtained. It readily dissolved in a number of oxidizable type coating materials, including phenolic varnish and litho oil such as is used in the manufacture of printing inks. Its drying performance in these vehicles was highly satisfactory.

Example 16

To 500 lbs. of the lead drier of the preceding example were added 50 gals. of mineral spirits. A solution was thus formed containing 24% metal. When this liquid lead drier was added to clear and pigmented oxidizable coating materials, including a house paint and a spar varnish, it was readily dissolved in the vehicle and carried out its drying function with complete satisfaction.

Example 17

750 lbs. of oleic acid were mixed with 250 lbs. of hydroxy salt of iron carrying 28% metal. The suspension of the hydroxy salt in the acid was then heated to approximately 300° F. Reaction set in with the liberation of water. After approximately 1½ hrs. duration the reaction was completed and an end product was obtained in the form of a plastic mass carrying 7% metal content. This mass was dissolved in a number of oxidizable type vehicles, including fish oil varnishes and vehicles for black baking enamels. It was found that this iron drier dissolved readily in the oxidizable film-forming vehicles and it carried out its drying function to complete satisfaction.

Example 18

704 lbs. of soya bean oil fatty acids were reacted at a temperature of approximately 420° F. with 288 lbs. of hydroxy manganese salt of 24% metal content. The reaction proceeded very rapidly with the result that the salt dissolved in the acid to form as an end product a soluble manganese drier in the form of a plastic mass containing approximately 7% metal. It was introduced into a number of oxidizable film-forming materials, including printing ink litho oils and it was found to possess good solubility in these vehicles with good drying performance.

Example 19

100 lbs. of the end product of the preceding example were dissolved in 75 lbs. of a hydrogenated petroleum solvent sold under the trade name of "Solvesso 3." The resultant product was a clear mobile liquid. It dissolved practically instantaneously in the various oxidizable film-forming materials to which it was added and gave good drying performance.

Example 20

720 lbs. of a commercial grade of tall oil (known under the trade-mark "Liqro") was brought to a temperature of approximately 400° F. There was then added, with stirring 234 lbs. of hydroxy manganese salt of 30% metal content. Heating and agitation were continued for approximately 1¾ hrs. until the reaction ceased, resulting in a soluble manganese drier of 7% metal content. This drier dissolved quite readily in various oxidizable film-forming materials and gave good drying performance.

Example 21

366 lbs. of 2-ethyl hexoic acid were reacted at approximately 240° F. with 634 lbs. of hydroxy manganese salt of 24% metal content. After a reaction period of approximately 1 hr., an end product resulted carrying 15% manganese metal. This end product was a clear solid mass. It dissolved quite readily in oxidizable film-forming materials and showed satisfactory drying performance.

In the examples heretofore given in detail reference has been made to the formation of driers, each of which embodies a single drying metal. Experience has shown, however, that a plurality of drying metals may be reacted at the same time with the acid to produce an end product drier which is soluble in oxidizable film-forming materials. A great number of combinations of these materials have been obtained, but I shall here give only a few examples as illustrative of the general concept.

EXAMPLE 22

610 lbs. of linseed oil fatty acids were heated to a temperature of approximately 370° F. While the heating continued, there was then added thereto 117 lbs. of hydroxy cobalt salt of 23% metal content. After the introduction of the cobalt hydroxy salt there was then introduced 280 lbs. of hydroxy lead salt of 64% metal content. After approximately 1 hr., the entire reaction was completed and the two hydroxy metal salts had reacted completely in the acid. The end product was a plastic mass of combined lead-cobalt drier carrying approximately 2.7% cobalt and approximately 17.5% lead. This combination drier dissolved readily in various oxidizable film-forming materials and gave good drying performance.

EXAMPLE 23

360 lbs. of 2-ethyl hexoic acid were mixed with 375 lbs. of a hydroxy lead salt carrying 64% lead and with 160 lbs. of a manganese hydroxy salt of 24% metal and 105 lbs. of a cobalt hydroxy salt of 23% metal. The resulting slurry was heated to a temperature of above 212° F. Reaction set in with the liberation of water. After approximately 1½ hrs. reaction time, complete reaction of the hydroxy metal salts in the acid had taken place. An end product was produced which represented a lead-cobalt-manganese combination drier which was readily soluble in oxidizable film-forming materials and showed good drying performance. It was also dissolved in various volatile solvents, including a mixture of xylol and mineral spirits to produce a clear liquid drier. This liquid drier was incorporated in various varnishes and other oxidizable film-forming materials. It dissolved in these vehicles almost instantaneously and gave fully satisfactory drying performance in the same.

It is found practical, when reacting together the hydroxy metal salt of a drying metal or metals with the acid, to use just enough acid as will give the reaction desired, i. e., a combining amount of the acid. However, I prefer, in practically carrying out the invention, to employ excess acid in this step so as to render the drying metal-acid composition, acid in character for I find that such a product when acid in character is more stable than the neutral product. These remarks are of particular practical importance in connection with cobalt and manganese driers.

The examples hereinbefore given are illustrative of the invention, but the same is to be commensurate with the appended claims.

Having thus fully described the invention what I claim as new and desire to secure by Letters Patent is:

1. The process of producing a drier, which comprises mixing together at least one hydroxy drying metal salt having present therein free hydroxide of the metal and a non-volatile, water-insoluble, non-aromatic, organic acid capable of producing, when chemically reacted with such hydroxy salt, a drier soluble in oxidizable drying oils and oil varnishes, and heating the mixture to a temperature sufficiently high to bring about chemical reaction between the hydroxy salt and the acid.

2. The process of producing a drier, which comprises mixing together at least one hydroxy drying metal salt having present therein free hydroxide of the metal and a non-volatile, water-insoluble, non-aromatic, organic acid capable of producing, when chemically reacted with such hydroxy salt, a drier soluble in oxidizable drying oils and oil varnishes, heating the mixture to a temperature sufficiently high to bring about chemical reaction between the hydroxy salt and the acid, and adding to the resulting reaction product a solvent thereof which is compatible with drying oils and oil varnishes.

3. The process of producing a drier, which comprises mixing together a plurality of different hydroxy drying metal salts each having present therein free hydroxide of the metal and a non-volatile, water-insoluble, non-aromatic, organic acid capable of producing, when chemically reacted with such hydroxy salts, a drier soluble in oxidizable drying oils and oil varnishes, and heating the mixture to a temperature sufficiently high to bring about chemical reaction between the hydroxy salts and the acid.

4. The process of producing a drier, which comprises mixing together a plurality of different hydroxy drying metal salts each having present therein free hydroxide of the metal and a non-volatile, water-insoluble, non-aromatic, organic acid capable of producing, when chemically reacted with such hydroxy salts, a drier soluble in oxidizable drying oils and oil varnishes, heating the mixture to a temperature sufficiently high to bring about chemical reaction between the hydroxy salts and the acid, and adding to the resulting reaction product a solvent thereof which is compatible with drying oils and oil varnishes.

5. The process of producing a drier, which comprises chemically reacting a non-volatile, water-insoluble, non-aromatic, organic acid with at least one hydroxy drying metal salt having present therein free hydroxide of the metal in the presence of sufficiently high temperature to cause complete reaction and mutual dissolution of the reactant components.

6. The process of producing a drier, which comprises chemically reacting a non-volatile, water-insoluble, non-aromatic, organic acid with at least one hydroxy drying metal salt having present therein free hydroxide of the metal in the presence of sufficiently high temperature to cause complete reaction and mutual dissolution of the reactant components, and adding to the resulting reaction product a solvent thereof which is compatible with drying oils and oil varnishes.

7. A drier soluble in paint, varnish and printing ink comprising the reaction product of a non-volatile, water-insoluble, non-aromatic, organic acid and at least one hydroxy drying metal salt having present therein free hydroxide of the metal in the presence of sufficient heat to cause complete reaction and mutual dissolution of the reactant components.

ARTHUR MINICH.

Jan. 4, 1944.   G. H. SHEA   2,338,137
MORTAR FLARE SHELL
Filed Aug. 4, 1942
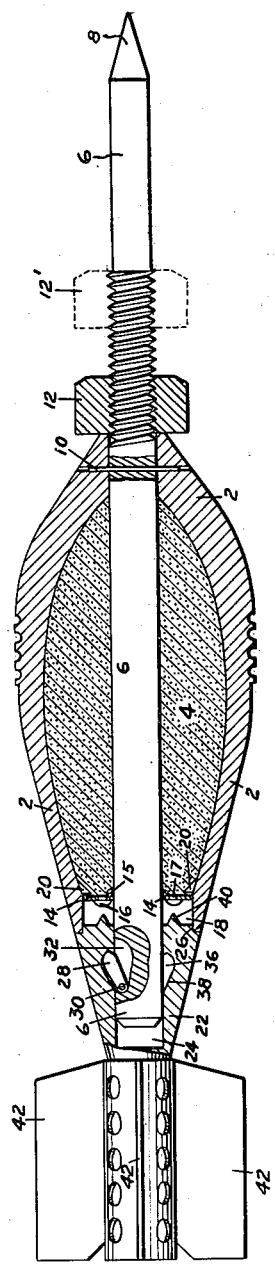
Inventor
Gerald H. Shea
By G. J. Kessenich + J. H. Church
Attorneys